(12) United States Patent
Li et al.

(10) Patent No.: US 11,849,052 B2
(45) Date of Patent: Dec. 19, 2023

(54) CERTIFICATE IN BLOCKCHAIN NETWORK, STORAGE MEDIUM, AND COMPUTER DEVICE

(71) Applicant: Tencent Technology (Shenzhen) Company Limited, Shenzhen (CN)

(72) Inventors: Mao Cai Li, Shenzhen (CN); Geng Liang Zhu, Shenzhen (CN); Hu Lan, Shenzhen (CN); Zong You Wang, Shenzhen (CN); Li Kong, Shenzhen (CN); Kai Ban Zhou, Shenzhen (CN); Chang Qing Yang, Shenzhen (CN); Qiu Ping Chen, Shenzhen (CN); Qu Cheng Liu, Shenzhen (CN); Yi Fang Shi, Shenzhen (CN); Jin Song Zhang, Shenzhen (CN); Pan Liu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 400 days.

(21) Appl. No.: 17/154,701

(22) Filed: Jan. 21, 2021

(65) Prior Publication Data
US 2021/0144017 A1 May 13, 2021

Related U.S. Application Data

(63) Continuation of application No. PCT/CN2020/113372, filed on Sep. 4, 2020.

(30) Foreign Application Priority Data

Sep. 12, 2019 (CN) .......................... 201910867310.6

(51) Int. Cl.
H04L 9/00 (2022.01)
H04L 9/32 (2006.01)
H04L 9/08 (2006.01)

(52) U.S. Cl.
CPC .......... *H04L 9/3268* (2013.01); *H04L 9/0825* (2013.01); *H04L 9/0861* (2013.01); *H04L 9/3236* (2013.01); *H04L 9/50* (2022.05)

(58) Field of Classification Search
CPC ... H04L 9/3268; H04L 9/0825; H04L 9/0861; H04L 9/3236; H04L 9/50; H04L 9/3247; H04L 9/3239; G06F 21/64
See application file for complete search history.

(56) References Cited

U.S. PATENT DOCUMENTS

| 10,951,418 B1* | 3/2021 | Graziano ............... H04L 9/3263 |
| 2007/0150737 A1* | 6/2007 | Parupudi ............... H04L 9/3263 |
| | | 713/175 |

(Continued)

FOREIGN PATENT DOCUMENTS

| CN | 107196900 A | 9/2017 |
| CN | 107395343 A | 11/2017 |

(Continued)

OTHER PUBLICATIONS

Search Report from the China State Intellectual Property Office for Application No. CN 201910867310.6 dated Mar. 10, 2021 (only Chinese language), (5 pages).

(Continued)

*Primary Examiner* — Jorge L Ortiz Criado
*Assistant Examiner* — Kevin Ayala
(74) *Attorney, Agent, or Firm* — Crowell & Moring LLP

(57) ABSTRACT

A method for replacing an identity certificate in a blockchain network includes a service subnet, a consensus subnet, and a routing layer used for isolating the service subnet from the (Continued)

consensus subnet. The method includes: receiving a root certificate replacement notification transmitted by a certificate authentication center; obtaining a public key corresponding to the certificate authentication center; verifying the root certificate replacement notification by using the obtained public key; forwarding the root certificate replacement notification to a consensus node in the consensus subnet after the validation succeeds, so that the consensus node records the root certificate replacement notification into a latest data block after a consensus on the root certificate replacement notification is reached; and requesting, when the data block is received, the certificate authentication center to replace an identity certificate. A new identity certificate obtained through requesting is authenticated with a new root certificate of the certificate authentication center.

20 Claims, 8 Drawing Sheets

(56) References Cited

U.S. PATENT DOCUMENTS

| | | | | |
|---|---|---|---|---|
| 2011/0040960 | A1* | 2/2011 | Deierling | G06F 21/572 |
| | | | | 711/163 |
| 2013/0346747 | A1* | 12/2013 | Ignatchenko | G06F 21/64 |
| | | | | 713/158 |
| 2017/0346639 | A1 | 11/2017 | Muftic | |
| 2018/0082290 | A1 | 3/2018 | Allen et al. | |
| 2018/0198631 | A1* | 7/2018 | Yang | H04W 12/40 |
| 2018/0262347 | A1* | 9/2018 | Levy | H04L 9/006 |
| 2020/0084483 | A1* | 3/2020 | Brown | G06Q 20/405 |
| 2020/0177373 | A1* | 6/2020 | Komandur | H04L 9/3247 |
| 2020/0382326 | A1* | 12/2020 | Guo | H04L 9/3239 |
| 2022/0094542 | A1* | 3/2022 | Wright | H04L 9/3236 |

FOREIGN PATENT DOCUMENTS

| | | | |
|---|---|---|---|
| CN | 108933667 A | | 12/2018 |
| CN | 109995536 A | * | 7/2019 |
| CN | 109995536 A | | 7/2019 |
| CN | 110061851 A | | 7/2019 |
| CN | 110601851 A | | 12/2019 |
| CN | 111563089 A | | 8/2020 |
| EP | 3 160 078 A1 | | 4/2017 |

OTHER PUBLICATIONS

International Search Report and Written Opinion received for Application No. PCT/CN2020/113372 dated Nov. 27, 2020 (English and Chinese languages), (9 pages).

* cited by examiner

CERTIFICATE IN BLOCKCHAIN NETWORK, STORAGE MEDIUM, AND COMPUTER DEVICE

RELATED APPLICATION

This application is a continuation application of PCT Patent Application No. PCT/CN2020/113372, filed on Sep. 4, 2020, which claims priority to Chinese Patent Application No. 201910867310.6, entitled "METHOD AND APPARATUS FOR REPLACING IDENTITY CERTIFICATE IN BLOCKCHAIN NETWORK" filed with the China National Intellectual Property Administration on Sep. 12, 2019, both of which are incorporated by reference in their entireties.

FIELD OF THE TECHNOLOGY

This application relates to the field of computer technologies, and in particular, to a method and an apparatus for replacing an identity certificate in a blockchain network, a computer-readable storage medium, and a computer device.

BACKGROUND OF THE DISCLOSURE

In a blockchain network, blockchain nodes generally need to verify identities of each other during communication, to ensure security of the blockchain network and data on the blockchain. Therefore, it is usually necessary to issue public and private keys for each blockchain node, and it is also necessary to issue an identity certificate for each blockchain node. The identity certificate is usually issued by an authoritative organization.

To improve the security of the blockchain network and avoid the risk of the identity certificate being cracked or leaked, the identity certificate of the blockchain node shall not remain unchanged, but needs to be replaced. However, based on extremely high requirements for security of the blockchain network, implementation of a replacement of the identity certificate of the blockchain node in the blockchain network is a difficult problem to be resolved.

SUMMARY

A method for replacing an identity certificate in a blockchain network is provided. The blockchain network includes a service subnet, a consensus subnet, and a routing layer used for isolating the service subnet from the consensus subnet. The method is executed by a computer device, and includes:

receiving a root certificate replacement notification transmitted by a certificate authentication center;
obtaining a public key corresponding to the certificate authentication center from an old root certificate of the certificate authentication center;
verifying the root certificate replacement notification by using the public key corresponding to the certificate authentication center;
forwarding the root certificate replacement notification to a consensus node in the consensus subnet after the validation succeeds, so that the consensus node records the root certificate replacement notification into a latest data block after a consensus on the root certificate replacement notification is reached; and
requesting, when the data block is received, the certificate authentication center to replace an identity certificate, a new identity certificate obtained through requesting being authenticated with a new root certificate of the certificate authentication center.

An apparatus for replacing an identity certificate in a blockchain network is provided. The blockchain network includes a service subnet, a consensus subnet, and a routing layer used for isolating the service subnet from the consensus subnet. The apparatus includes:

a root certificate replacement notification receiving module, configured to receive a root certificate replacement notification transmitted by a certificate authentication center;
an obtaining module, configured to obtain a public key corresponding to the certificate authentication center from an old root certificate of the certificate authentication center;
a root certificate replacement notification verification module, configured to verify the root certificate replacement notification by using the public key corresponding to the certificate authentication center;
a root certificate replacement notification forwarding module, configured to forward the root certificate replacement notification to a consensus node in the consensus subnet after the validation succeeds, so that the consensus node records the root certificate replacement notification into a latest data block after a consensus on the root certificate replacement notification is reached; and
an identity certificate replacement module, configured to request, when the data block is received, the certificate authentication center to replace an identity certificate, a new identity certificate obtained through requesting being authenticated with a new root certificate of the certificate authentication center.

One or more non-transitory computer-readable storage media storing computer-readable instructions are provided. When executed by one or more processors, the computer-readable instructions cause the one or more processors to perform the following steps:

receiving a root certificate replacement notification transmitted by a certificate authentication center;
obtaining a public key corresponding to the certificate authentication center from an old root certificate of the certificate authentication center;
verifying the root certificate replacement notification by using the public key corresponding to the certificate authentication center;
forwarding the root certificate replacement notification to a consensus node in the consensus subnet after the validation succeeds, so that the consensus node records the root certificate replacement notification into a latest data block after a consensus on the root certificate replacement notification is reached; and
requesting, when the data block is received, the certificate authentication center to replace an identity certificate, a new identity certificate obtained through requesting being authenticated with a new root certificate of the certificate authentication center.

A computer device including a memory and one or more processors is provided. The memory stores computer-readable instructions. The computer-readable instructions, when executed by the one or more processors, cause the one or more processors to perform the following steps:

receiving a root certificate replacement notification transmitted by a certificate authentication center;
obtaining a public key corresponding to the certificate authentication center from an old root certificate of the certificate authentication center;

verifying the root certificate replacement notification by using the public key corresponding to the certificate authentication center;

forwarding the root certificate replacement notification to a consensus node in the consensus subnet after the validation succeeds, so that the consensus node records the root certificate replacement notification into a latest data block after a consensus on the root certificate replacement notification is reached; and requesting, when the data block is received, the certificate authentication center to replace an identity certificate, a new identity certificate obtained through requesting being authenticated with a new root certificate of the certificate authentication center.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

Figure 1:
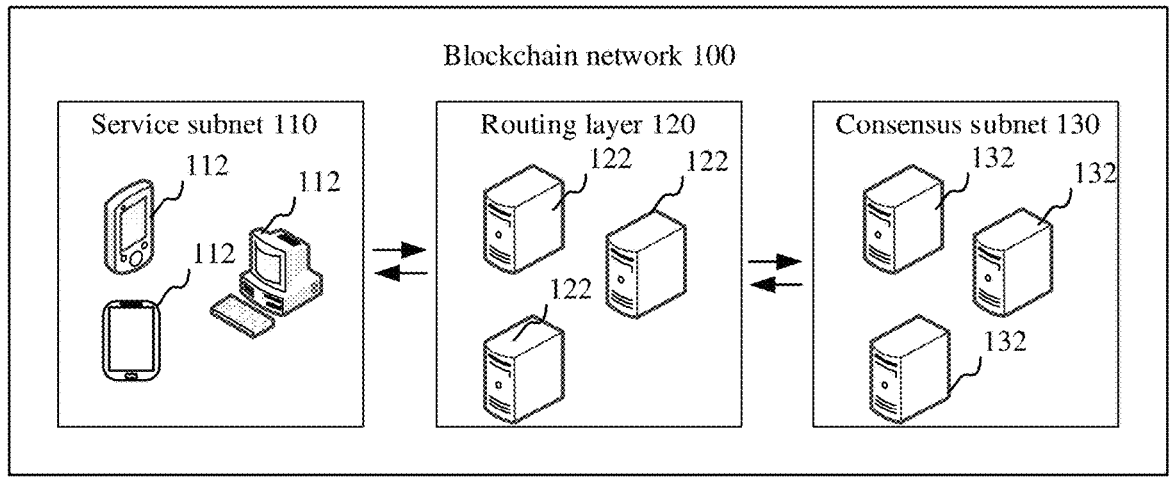
FIG. 1 is a diagram of an application environment of a method for replacing an identity certificate in a blockchain network according to an embodiment.

FIG. 1 is a diagram of an application environment of a method for replacing an identity certificate in a blockchain network according to an embodiment. Referring to FIG. 1, the method for replacing an identity certificate in a blockchain network is applied to a blockchain network 100. The blockchain network includes a network formed by related nodes recording and querying data blocks on a blockchain. Each node in the blockchain network is a blockchain node, which is a computer device that can query or record the data blocks. As shown in FIG. 1, the blockchain network 100 includes a service subnet 110, a routing layer 120, and a consensus subnet 130. A service node 112 in the service subnet 110 is connected to a routing node 122 in the routing layer 120 through a network. The routing node 122 is connected to a consensus node 132 in the consensus subnet 130 through a network. Therefore, the service subnet 110 and the consensus subnet 130 communicate with each other through the routing node 122.

The service node 112 may be specifically a desktop terminal or a mobile terminal used by a service provider generating transaction information. The mobile terminal may be specifically at least one of a mobile phone, a tablet computer, a notebook computer, and the like. The routing node 122 may be implemented by using an independent server or a server cluster that includes a plurality of servers. The consensus node 132 in the consensus subnet 130 may record the transaction information generated by the service node into the blockchain. The consensus node 132 may be implemented by using an independent server or a server cluster that includes a plurality of servers. When the blockchain network is applied to an application scenario of processing electronic bill data, the consensus node in the consensus subnet is usually set under the authorization of a supervision organization.

The blockchain is a carrier and an organization manner of running a blockchain technology (BT). The BT, also referred to as a distributed ledger technology, is an Internet database technology characterized by decentralization, openness, and transparency, so that everyone can participate in database recording. The BT is a distributed-infrastructure and computing-paradigm that uses a block-chain data structure to authenticate and store data, a distributed-node-consensus algorithm to generate and update data, cryptography to safeguard a process of data transmission and data access, and smart contracts formed by automated scripts to write code and process data.

Figure 2:
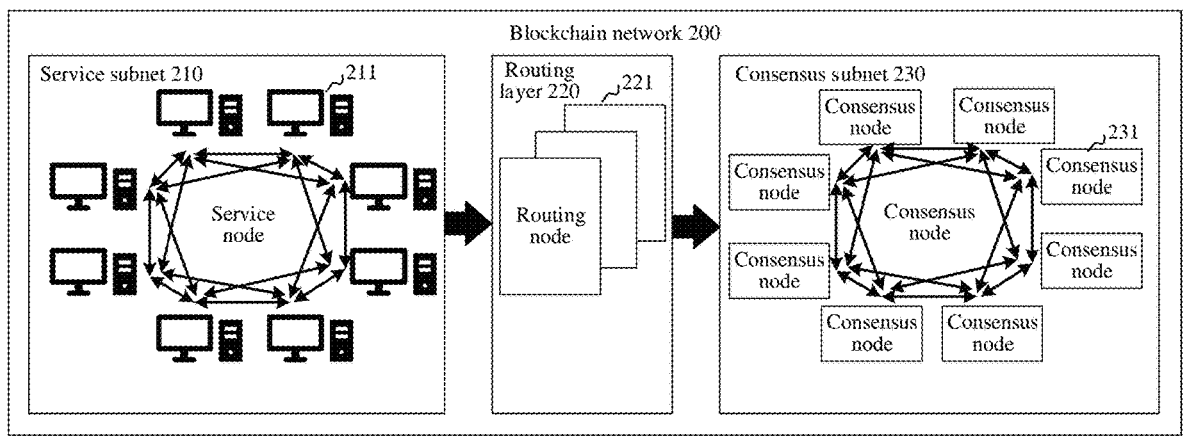
FIG. 2 is a schematic architectural diagram of a blockchain network according to an embodiment.

FIG. 2 is a schematic architectural diagram of a blockchain network according to an embodiment. Referring to FIG. 2, a blockchain network 200 includes a service subnet 210, a routing layer 220, and a consensus subnet 230. The service subnet 210 includes a service node 211 for verifying a data block recorded on a blockchain by a consensus node. The consensus subnet 230 includes a consensus node 231 for recording a data block onto the blockchain. The service subnet 210 is connected to the consensus subnet 230 through the routing layer 220. A routing node 221 in the routing layer 220 may pass a data processing request sent by the service node 211 to the consensus node 231. The routing node 221 may further forward transaction information on the blockchain obtained from the consensus node 231 to the service node 211. The service node 211 is deployed in the service subnet in a public network. The consensus node 231 running a blockchain consensus protocol is deployed in the private consensus subnet. The service node 211 interacts with the consensus node 231 through the routing node. The routing node 221 plays an isolation role between the service subnet 210 and the core consensus subnet 230. In the service subnet 210, each service node is equivalent, and a peer-to-peer (P2P) network is formed among the service nodes. A P2P protocol is an application-layer protocol running over the Transmission Control Protocol (TCP). The service node 211 may pass a message received from the routing node 221 to service nodes around, so that the message can be propagated between the service nodes in the service subnet.

Figure 3:
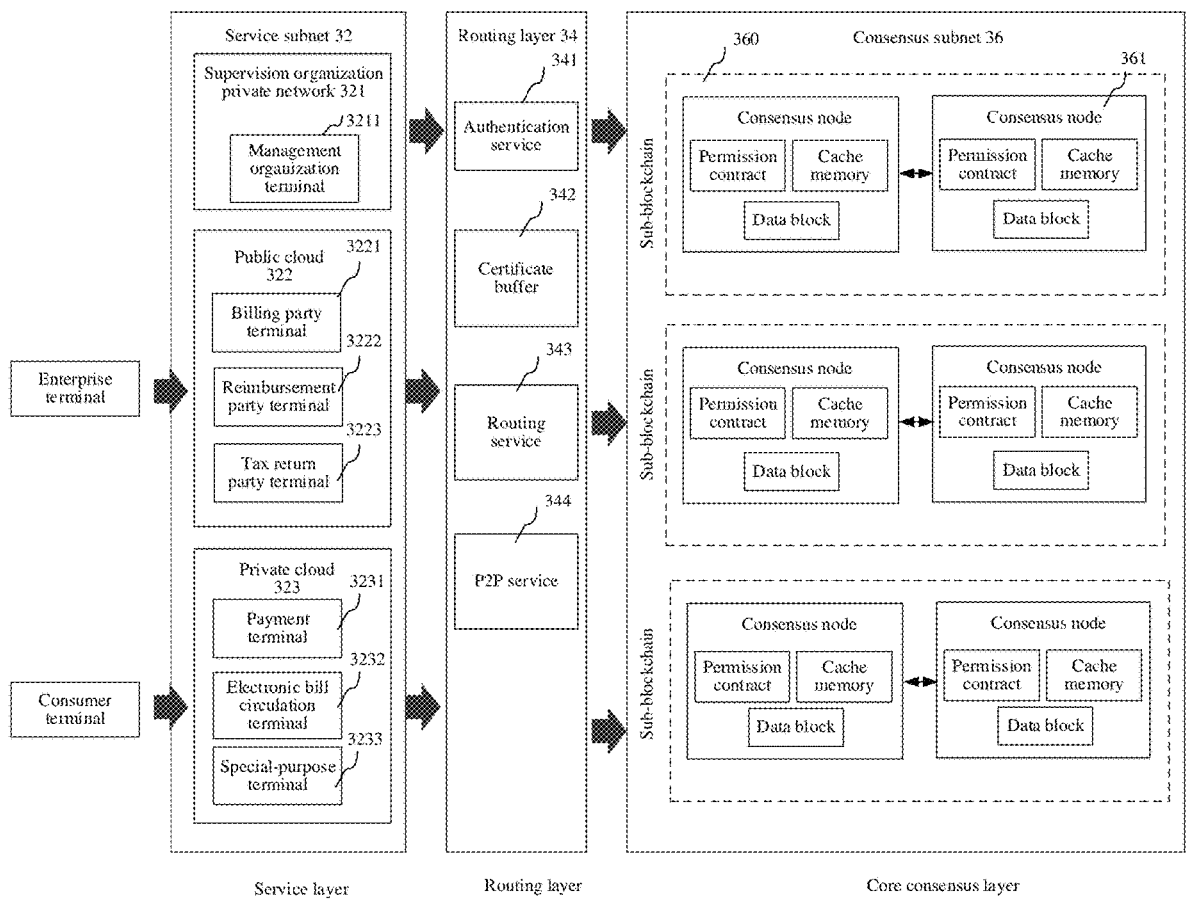
FIG. 3 is a schematic architectural diagram of a blockchain network applied to an electronic bill scenario according to a specific embodiment.

FIG. 3 is a schematic architectural diagram of a blockchain network applied to an electronic bill scenario according to a specific embodiment. When the above blockchain network is applied to the electronic bill scenario, the blockchain network may record transaction information generated in the circulation process of an electronic bill. Referring to FIG. 3, the blockchain network includes a service subnet 32, a routing layer 34, and a consensus subnet 36.

The circulation process of the electronic bill includes electronic bill application, electronic bill issuance, electronic bill reimbursement, electronic bill tax return, and the like. The electronic bill issuance is also referred to as electronic bill generation. Roles related to the entire circulation process of the electronic bill include a supervision organization, a billing party, a reimbursement party, and a tax return party. As a result, the service subnet 32 includes a supervision organization private network 321 providing related services for the supervision organization, a public cloud 322 providing related services for the billing party, the reimbursement party, and the tax return party, and a private cloud 323 providing an electronic bill storage service for consumers. The supervision organization private network 321 includes a computer device used by the supervision organization related to the electronic bill, which includes a supervision organization terminal 3211. The public cloud 322 includes computer devices used by the billing party, the reimbursement party, and the tax return party related to the electronic bill, including a billing party terminal 3221, a reimbursement party terminal 3222, and a tax return party terminal 3223. The billing party may be a billing service provider, the reimbursement party may be a reimbursement service provider, and an enterprise terminal may access the public cloud. The private cloud 323 includes computer devices used by a user related to the electronic bill, including a payment terminal 3231 configured to perform payment, an electronic bill circulation terminal 3232 configured to store the electronic bill temporarily for the user, and a special purpose terminal 3233 for some enterprises. A consumer terminal may access the private cloud. The computer devices in the supervision organization private network 321, the public cloud 322, and the private cloud 323 may serve as the service nodes to send, to the consensus subnet through the routing node, data chaining requests or data query requests for electronic bills.

Any routing node in the routing layer 34 includes functional modules providing an authentication service 341, a certificate buffer 342, a routing service 343, and a P2P service 344. The authentication service 341 is configured to perform identity verification on the service node in the service subnet. The certificate buffer 342 is configured to temporarily store the identity certificate of each node. The routing service 343 is configured to implement network isolation between the service subnet and the consensus subnet. The P2P service is configured to distribute tasks among the routing nodes with idempotence. A peer-to-peer (P2P) network is formed among the routing nodes. A P2P protocol is an application-layer protocol running over the Transmission Control Protocol (TCP).

The consensus subnet 36 includes a plurality of consensus branch networks 360. Each consensus branch network 360 includes a plurality of consensus nodes 361. The plurality of consensus nodes 361 maintain a sub-blockchain corresponding to the consensus branch network 360. For example, some sub-blockchains are used for recording transaction information related to electronic bills belonging to a specific bill number range, and some sub-blockchains are used for recording transaction information related to reverse electronic bills. When data related to an electronic bill needs to be recorded, a sub-blockchain to which data is to be recorded may be determined according to a permission of the service node, and then the data is recorded by the consensus branch network maintaining the sub-blockchain. The consensus nodes 361 generally may be computer devices used by supervision organizations of various regions. The consensus node 361 in each consensus branch network 360 includes a permission contract. The permission contract stores circulation logic related to an entire life cycle of an electronic bill, such as a bill status of the electronic bill, a circulation process, a data access permission, a condition for electronic bill application, and a condition for electronic bill issuance. The consensus node 361 further includes a cache memory and a data block. Such functions provide support for chaining and query of transaction information.

Figure 4:
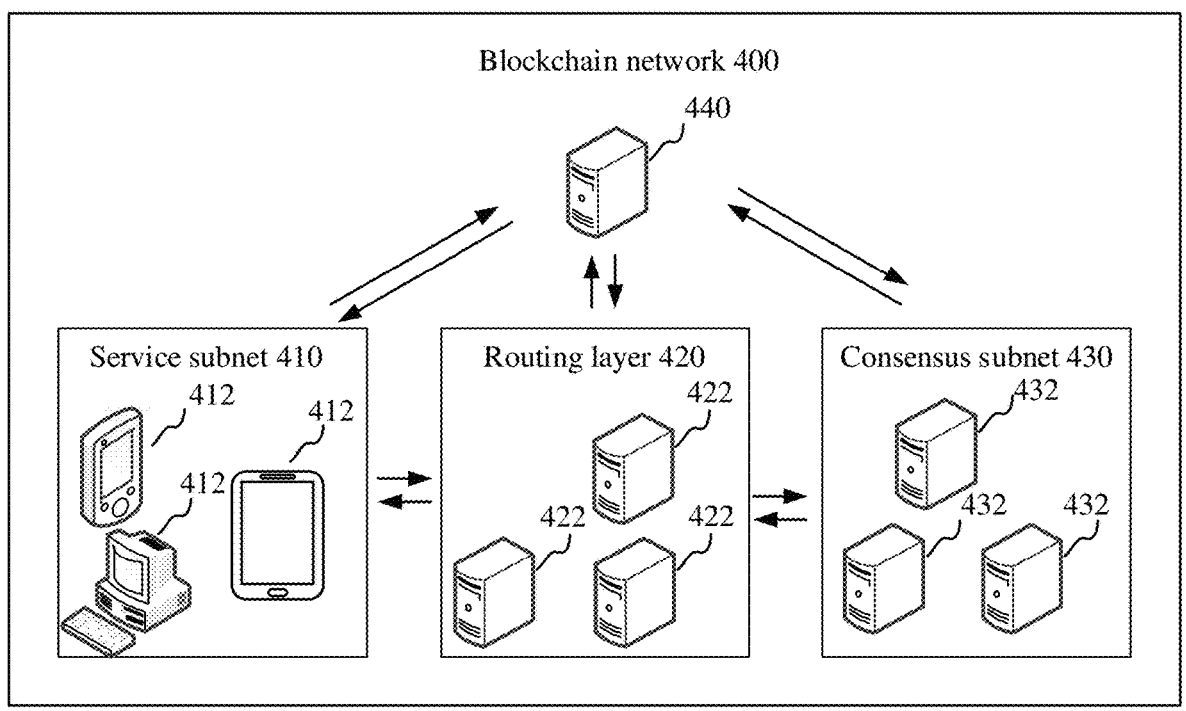
FIG. 4 is a schematic architectural diagram of a system for replacing an identity certificate in a blockchain network according to an embodiment.

FIG. 4 is a schematic architectural diagram of a system for replacing an identity certificate in a blockchain network according to an embodiment. Referring to FIG. 4, a blockchain network 400 includes a service subnet 410, a routing layer 420, a consensus subnet 430, and a certificate authentication center 440. A service node 412 in the service subnet 410 is connected to a routing node 422 in the routing layer 420 through a network. The routing node 422 is connected to a consensus node 432 in the consensus subnet 430 through a network. Therefore, the service subnet 410 and the consensus subnet 430 communicate with each other through the routing node 422. The certificate authentication center 440 may release a certificate update notification to the consensus subnet 430 through the routing node 422. The service node 412 and the routing node 422 may download an updated root certificate from the certificate authentication center 440, and may further obtain a new identity certificate from the certificate authentication center 440.

In an embodiment, the routing node 422 may receive a root certificate replacement notification sent by the certificate authentication center 440; a public key corresponding to the certificate authentication center 440 is obtained from an old root certificate of the certificate authentication center 440; the root certificate replacement notification is verified by using the public key corresponding to the certificate authentication center 440; after the validation succeeds, the root certificate replacement notification is forwarded to the consensus node 432 in the consensus subnet 430, so that the consensus node 432 records the root certificate replacement notification into a latest data block after a consensus on the root certificate replacement notification is reached; and when receiving the data block, the routing node 422 requests the certificate authentication center 440 to replace an identity certificate, and a new identity certificate obtained through requesting is authenticated with a new root certificate of the certificate authentication center 440. The latest data block may be a next available data block in the routing node 422 or another data storage element.

Figure 5:
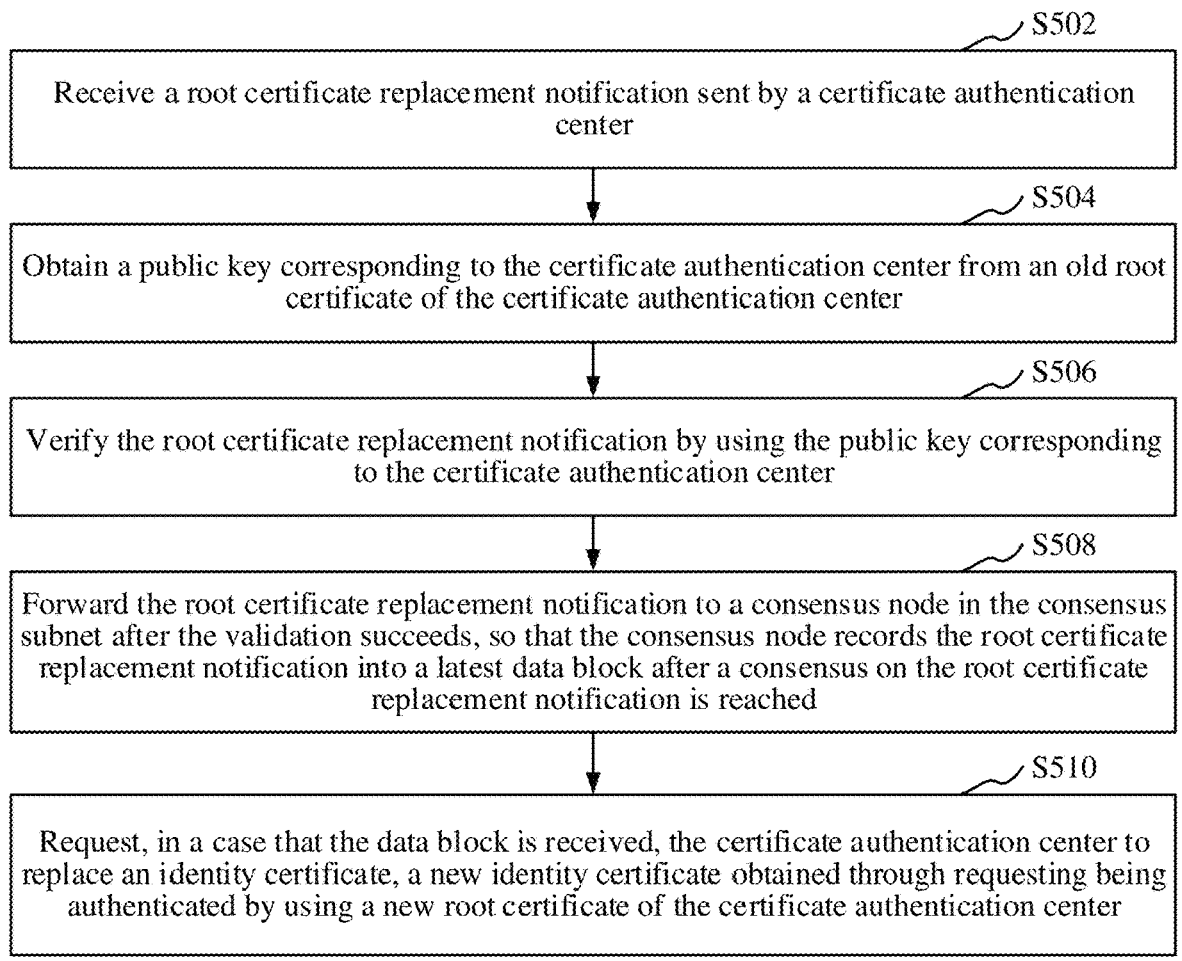
FIG. 5 is a schematic flowchart of a method for replacing an identity certificate in a blockchain network according to an embodiment.

As shown in FIG. 5, in an embodiment, a method for replacing an identity certificate in a blockchain network is provided. The blockchain network includes a service subnet, a consensus subnet, and a routing layer used for isolating the service subnet from the consensus subnet. This embodiment is described mainly by using an example in which the method is applied to the routing node 422 in FIG. 4.

Referring to FIG. 5, the method for replacing an identity certificate in a blockchain network specifically includes the following steps:

S502. Receive a root certificate replacement notification sent by a certificate authentication center.

The certificate authentication center is a blockchain node for issuing identity certificates. In a scenario of the blockchain network being applied to an electronic bill, according to management logic of the electronic bill, the certificate authentication center may include a root certificate authentication center, a primary certificate authentication center, a secondary certificate authentication center, and an establishment certificate authentication center. The root certificate authentication center is used for generating a root certificate. The root certificate is a certificate used for signing other certificates by the root certificate authentication center. The root certificate is self-signed by the root certificate authentication center. The root certificate authentication center may determine the primary certificate authentication center according to the root certificate and issue a primary identity certificate for the primary certificate authentication center. The primary certificate authentication center is usually a supervision organization terminal, that is, the root certificate authentication center issues a supervision organization identity certificate for the supervision organization terminal. The primary certificate authentication center is used for determining the secondary certificate authentication center according to the primary identity certificate and issuing a secondary identity certificate for the secondary certificate authentication center. The secondary certificate authentication center is usually a management organization terminal, that is, the primary certificate authentication center issues a management organization identity certificate for the management organization terminal. The secondary certificate authentication center is used for determining the establishment certificate authentication center according to the secondary identity certificate and issuing an establishment identity certificate for the establishment certificate authentication center. Establishments are usually service nodes, such as terminal devices of a public cloud and a private cloud in the service subnet, such as is shown in FIG. 3. That is, the secondary certificate authentication center issues a service node identity certificate for the service node.

The certificate authentication center in this application has functions of generating a root certificate, updating the root certificate, and issuing updated identity certificates for the service node and the routing node according to a new root certificate. Certainly, the root certificate authentication center can issue new identity certificates for the primary certificate authentication center, the secondary certificate authentication center, the establishment certificate authentication center, the service node, and the routing node according to the new root certificate. In particular, after the root certificate is updated, the service node may gradually replace its old identity certificate through replaced identity certificates of the primary certificate authentication center, the secondary certificate authentication center, and the establishment certificate authentication center.

In an embodiment provided by this application, the primary certificate authentication center, the secondary certificate authentication center, and the establishment certificate authentication center may be collectively referred to as the certificate authentication center and provide support for generating identity certificates of the service node and the routing node.

The root certificate replacement notification is a notification for notifying all participants that the root certificate has been replaced in the blockchain network. To continue to communicate with each other in the blockchain network, the participants need to obtain new identity certificates issued based on the new root certificate. In an embodiment, root certificate replacement information in the root certificate replacement notification includes at least a release time of the new root certificate, a public key of the new root certificate, and an expiration time of the old root certificate.

Specifically, after generating the new root certificate, the certificate authentication center generates the root certificate replacement notification according to the root certificate replacement information such as the root certificate public key of the new root certificate, the release time of the new root certificate, and the expiration time of the old root certificate, and sends the root certificate replacement notification to the routing node, to submit the root certificate replacement notification to the consensus node in the consensus subnet through the routing node.

In an embodiment, the new root certificate of the certificate authentication center is generated by the following steps: the certificate authentication center receives a root certificate replacement instruction; the certificate authentication center marks an existing root certificate as an old root certificate according to the instruction; and the certificate authentication center generates a new root certificate, the generated new root certificate being used for issuing or replacing an identity certificate for a node in the blockchain network by the certificate authentication center.

Specifically, in a process of normal running of the entire blockchain network, for security, the root certificate needs to be replaced. The root certificate replacement instruction may be triggered by a system administrator and sent to the certificate authentication center. After receiving the instruction, the certificate authentication center marks an existing root certificate as an old root certificate and generates a new root certificate. The new root certificate is used for issuing or replacing an identity certificate for a node in the blockchain network.

Although the existing root certificate is marked as an old root certificate, before the expiration time of the old root certificate, the old root certificate can still be normally used, that is, the old root certificate can be used as a proof of a valid identity.

In an embodiment, after the certificate authentication center generates the new root certificate, a corresponding hash value may be generated by using a preset algorithm according to the root certificate replacement information including the public key of the root certificate, the release time of the new root certificate, and the expiration time of the old root certificate, and a signature is obtained by encrypting the generated hash value with a private key in a public and private key pair. The root certificate replacement notification is generated according to the root certificate replacement information and the signature, and the root certificate replacement notification is sent to the routing node.

S504. Obtain a public key corresponding to the certificate authentication center from an old root certificate of the certificate authentication center.

Specifically, the routing node stores the root certificate of the certificate authentication center, and the root certificate is obviously the old root certificate. The routing node may obtain the public key corresponding to the certificate authentication center from the old root certificate of the certificate authentication center and use the public key corresponding to the certificate authentication center to verify the root certificate replacement notification.

S506. Verify the root certificate replacement notification by using the public key corresponding to the certificate authentication center.

Specifically, the root certificate replacement notification, as a piece of transaction information, needs to be recorded into the blockchain of the consensus subnet, and also needs to be equally verified and agreed upon in consensus as common transaction information. When the routing node performs verification, on the one hand, identity validity of the node sending the root certificate replacement notification is verified, and on the other hand, authenticity of the root certificate replacement notification is verified. After the verification succeeds, the routing node can submit the root certificate replacement notification to the consensus subnet.

In an embodiment, the root certificate replacement notification includes the hash value of the root certificate replacement information, and the hash value is signed with the private key corresponding to the certificate authentication center. The verifying of the root certificate replacement notification by using the public key corresponding to the certificate authentication center includes: verifying the signature by using the public key corresponding to the certificate authentication center to obtain a hash value of the root certificate replacement information, the hash value being obtained by performing calculation on the root certificate replacement information by using a preset algorithm by the certificate authentication center; directly calculating a hash value of the root certificate replacement information by using the preset algorithm; and determining that the verification succeeds when the hash value obtained by verifying the signature of the root certificate replacement information is equal to the hash value obtained by calculation.

In this embodiment, the root certificate replacement notification includes the root certificate replacement information and the signature. The signature is obtained by encrypting the hash value of the root certificate replacement information by the certificate authentication center using the private key. The hash value is a unique character string obtained by transforming the root certificate replacement information by the certificate authentication center using a preset algorithm. After the routing node receives the certificate replacement notification, the signature is verified by using the public key corresponding to the certificate authentication center. If the signature verification succeeds, the root certificate replacement information is actually sent by the certificate authentication center. After the signature verification succeeds, the routing node may obtain the hash value of the root certificate replacement information. Further, the routing node may directly calculate the hash value of the root certificate replacement information by using the preset algorithm. If the hash value obtained by verifying the signature is equal to the directly calculated hash value, the root certificate replacement information is not maliciously tampered with and is valid. Based on the above, the authenticity of the identity of the certificate authentication center and the certificate replacement notification is verified.

S508. Forward the root certificate replacement notification to a consensus node in a consensus subnet after the validation succeeds, so that the consensus node records the root certificate replacement notification into a latest data block after a consensus on the root certificate replacement notification is reached.

Specifically, after the routing node verifies the root certificate replacement notification and the verification succeeds, the routing node may forward the root certificate replacement notification to any consensus node in the consensus subnet according to the identity certificate of the routing node. The consensus nodes attempt to reach a consensus on the root certificate replacement notification in the consensus subnet, and records the root certificate replacement notification into the latest data block after the consensus is reached.

The consensus is a process in which a plurality of participating blockchain nodes reach an agreement upon some data, actions, or procedures through interaction with each other according to a preset rule. In this embodiment, when any consensus node in the consensus subnet receives transaction information to be recorded on the blockchain, each consensus node may compare the identity information of the routing node sending the root certificate replacement notification with the locally pre-stored identity information of the routing node to confirm whether the received identity information is consistent with the stored identity information. When the received identity information is consistent with the stored identity information, the received identity information is confirmed to be valid, and the authentication result corresponding to the each consensus node is that the authentication succeeds; otherwise, the authentication result is that the authentication fails.

Further, it can be determined, based on the authentication result of each consensus node, whether the consensus is reached. In the process of determining whether the consensus is reached, at least one of a first quantity corresponding to consensus nodes whose authentication results are that the certification succeeds and at least one of a second quantity corresponding to consensus nodes whose authentication results are that the certification fails may be obtained, and the identity authentication result is determined according to at least one of the first quantity and at least one of the second quantity. For example, the identity authentication result may be success when at least one of the following conditions is met: the first quantity is greater than the second quantity, the first quantity reaches a first preset threshold, a ratio of the first quantity to the quantity of the consensus nodes participating in the consensus verification reaches a second preset threshold. Specific values corresponding to the first preset threshold and the second preset threshold may be set as required. For example, assuming that authentication results corresponding to consensus nodes 1 to 4 are success, success, success, and failure respectively, the first quantity is 3, and the second quantity is 1. Assuming that a condition for reaching a consensus is that a ratio of the first quantity to the quantity of the consensus nodes participating in the consensus verification is greater than or equal to ¾, a consensus is reached.

S510. Request, when the data block is received, the certificate authentication center to replace an identity certificate, a new identity certificate obtained through requesting being authenticated with a new root certificate of the certificate authentication center.

Because data blocks recorded on the blockchain can be synchronized to all routing nodes in the routing layer so that data on the blockchain is supervised, the collective malice of the consensus subnet may be prevented, thus ensuring the authenticity of the data. Therefore, the data blocks recorded on the blockchain may be synchronized to the routing node, and the routing node may also obtain the data block including the root certificate replacement notification. When the routing node parses out the root certificate replacement notification from a certain data block, it indicates that the root certificate needs to be replaced and the identity certificate of the routing node also needs to be replaced. In this case, the routing node may request a new root certificate from the certificate authentication center and request a new identity certificate signed with the new root certificate from the certificate authentication center.

After the root certificate is replaced, each blockchain node in the blockchain network needs to replace its identity certificate by using the new root certificate to prevent a security risk caused by leakage of the identity certificates of the blockchain nodes.

In an embodiment, the above method further includes: extracting the root certificate replacement notification from the data block when the data block is received; obtaining an expiration time of the root certificate of the certificate authentication center from the root certificate replacement notification; marking a locally stored root certificate of the certificate authentication center as an old root certificate, and setting an expiration time of the old root certificate according to the obtained expiration time.

In this embodiment, the routing node marks the locally stored root certificate currently used by the certificate authentication center as an old root certificate, and sets the expiration time of the local old root certificate according to the expiration time of the root certificate obtained from the root certificate replacement notification, which can effectively ensure a time for transition from the old root certificate to the new root certificate. Before replacement with the new root certificate and replacement of the identity certificate, both the new root certificate and the old root certificate can be verified normally, and both the new identity certificate and the old identity certificate can be signed normally, ensuring that the routing node can continue normal communication.

In an embodiment, the above method further includes: downloading the new root certificate generated by the certificate authentication center from the certificate authentication center; and when a blockchain data request sent by a service node in the service subnet is received, verifying identity of the service node according to the downloaded new root certificate of the certificate authentication center.

In this embodiment, after receiving the data block including the root certificate replacement notification, the routing node downloads a latest root certificate from the certificate authentication center and marks the downloaded root certificate as a new root certificate. When the blockchain data request sent by the service node in the service subnet is received, the identity of the service node is verified according to the new root certificate. The blockchain data request includes a data chaining request or a data query request. The service node needs to send the blockchain data request through the routing node, and then the routing node forwards the blockchain data request to the consensus node. When sending the blockchain data request, the service node may simultaneously send its identity certificate. The identity certificate is signed with the root certificate of the certificate authentication center. Therefore, after receiving the blockchain data request, the routing node may check whether the identity certificate sent by the service node is valid by using the root certificate public key in the new root certificate, to verify the identity of the service node.

In an embodiment, the root certificate replacement notification in the data block includes a new root certificate public key. After downloading the latest root certificate from the certificate authentication center, the routing node may compare the root certificate public key in the downloaded root certificate with the new root certificate public key obtained from the data block. If the root certificate public key in the downloaded root certificate is consistent with the new root certificate public key obtained from the data block, it indicates that the downloaded root certificate is the latest root certificate, and the downloaded root certificate is marked as the new root certificate. If the root certificate public key in the downloaded root certificate is not consistent with the new root certificate public key obtained from the data block, it indicates that the downloaded root certificate is not the real new root certificate, a fake certificate authentication center may be accessed, and a fake root certificate is downloaded. In this case, it is necessary to attempt to download the real new root certificate from the certificate authentication center again.

In an embodiment, the above method further includes: verifying, when the blockchain data request sent by the service node in the service subnet is received before the expiration time, the identity of the service node according to the old root certificate of the certificate authentication center or the downloaded new root certificate of the certificate authentication center.

In this embodiment, when the routing node receives the blockchain data request sent by the service node in the service subnet before the expiration time, the identity certificate of the service node may be verified either by using the local old root certificate or by using the downloaded new root certificate. Optionally, after the expiration time is reached, the routing node may remove the local old root certificate.

Figure 6:
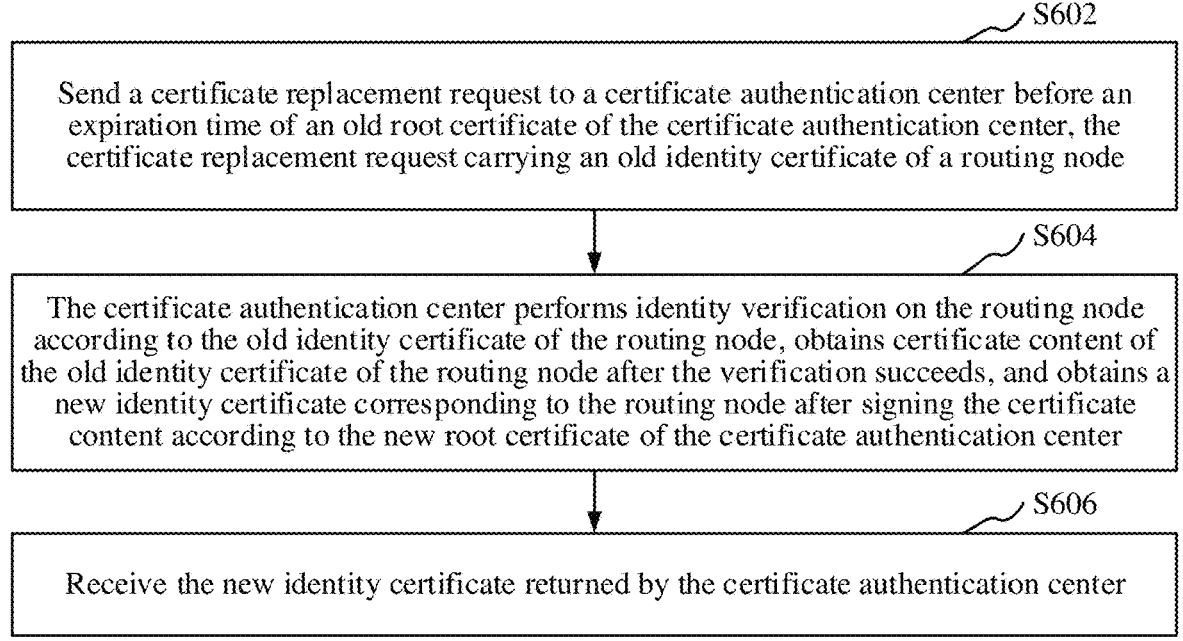
FIG. 6 is a schematic flowchart of requesting a certificate authentication center to replace an identity certificate according to an embodiment.

As shown in FIG. 6, in an embodiment, the requesting of the certificate authentication center to replace an identity certificate includes the following steps:

S602. Send a certificate replacement request to the certificate authentication center before an expiration time of an old root certificate of the certificate authentication center, the certificate replacement request carrying an old identity certificate of a routing node.

Specifically, after the new root certificate is obtained, the routing node needs to request, before the expiration time of the old root certificate, the certificate authentication center to replace the identity certificate of the routing node.

S604. The certificate authentication center performs identity verification on the routing node according to the old identity certificate of the routing node, obtains certificate content of the old identity certificate of the routing node after the verification succeeds, and obtains a new identity certificate corresponding to the routing node after signing the certificate content according to the new root certificate of the certificate authentication center.

Specifically, after receiving the certificate replacement request sent by the routing node, the certificate authentication center may sign the certificate content by using the new root certificate and then return the signed certificate content to the routing node while ensuring that the certificate content in the identity certificate of the routing node remains unchanged, that is, the routing node may replace its identity certificate when its local public and private key pair is not changed.

S606. Receive the new identity certificate returned by the certificate authentication center.

In this embodiment, although the identity certificate of the routing node is replaced, identity information of the routing node is not changed, which can effectively prevent leakage of the identity information of the routing node during replacement of the identity certificate.

In the above method for replacing an identity certificate in a blockchain network, the blockchain network includes a service subnet, a routing layer, and a consensus subnet. The certificate authentication center sends the root certificate replacement notification to the routing node. When receiving the root certificate replacement notification sent by the certificate authentication center, the routing node verifies the root certificate replacement notification by using the public key in the old root certificate of the certificate authentication center, to ensure that the notification is indeed sent by the certificate authentication center. After the verification succeeds, the routing node forwards the notification to the consensus subnet, and the notification may be recorded into a latest data block after the consensus nodes reach a consensus. In this case, when the service node in the service subnet and the routing node in the routing layer that participate in the blockchain network synchronize the data block including the notification, the service node and the routing node request, from the certificate authentication center, identity certificates issued by using the new root certificate of the certificate authentication center, achieving the replacement of the identity certificate for each node in the blockchain network, and preventing the risk of the identity certificate being cracked or leaked.

In an embodiment, the above method further includes: synchronizing the data block to a service node in the service subnet, so that the service node requests, when the root certificate replacement notification is parsed out from the data block, the certificate authentication center to replace an identity certificate.

Similarly, because the data block recorded on the blockchain can be synchronized to each service node in the service subnet so that the data on the blockchain is supervised by the service nodes, the collective malice of the consensus subnet may be prevented to ensure the authenticity of the data. Therefore, when the routing node receives the data block recorded on the blockchain, the data block may also be forwarded to each service node in the service subnet by the routing node, and the service node may also obtain the data block including the root certificate replacement notification. When the service node learns, through parsing, that a certain data block includes the root certificate replacement notification, indicating that the root certificate needs to be replaced and the identity certificate of the service node also needs to be replaced, the service node may request a new root certificate from the certificate authentication center and a new identity certificate signed with the new root certificate from the certificate authentication center.

In an embodiment, the step of requesting, by the service node, the certificate authentication center to replace an identity certificate includes: obtaining, by the service node, an expiration time of the root certificate of the certificate authentication center from the root certificate replacement notification, and sending a certificate replacement request carrying an old identity certificate of the service node to the certificate authentication center before the expiration time; and performing, by the certificate authentication center under the instruction of the certificate replacement request, identity verification on the service node according to the old identity certificate of the service node, obtaining certificate content of the old identity certificate of the service node after the verification succeeds, obtaining a new identity certificate corresponding to the service node after signing the certificate content according to the new root certificate of the certificate authentication center, and returning the new identity certificate to the service node.

Similarly, after receiving the data block including the root certificate replacement notification, the service node obtains the expiration time of the root certificate from the root certificate replacement notification. The service node downloads the new root certificate from the certificate authentication center before the expiration time, and sends the certificate replacement request carrying the old identity certificate of the service node to the certificate authentication center before the expiration time. While ensuring that the certificate content in the identity certificate of the service node remains unchanged, the certificate authentication center may use its new root certificate to sign the certificate content, and then return the new root certificate to the service node requesting the new identity certificate, that is, the service node may replace its identity certificate without changing its local public and private key pair.

In an embodiment, the above method further includes: marking, by the service node, a locally stored root certificate of the certificate authentication center as an old root certificate, setting an expiration time of the old root certificate according to the obtained expiration time, downloading the new root certificate generated by the certificate authentication center from the certificate authentication center, and verifying, when blockchain data sent by the routing node is received, identity of the routing node according to the downloaded new root certificate of the certificate authentication center.

Specifically, the service node may mark the locally stored root certificate currently used by the certificate authentication center as an old root certificate, the expiration time of the old root certificate is set according to the obtained expiration time, and the new root certificate generated by the certificate authentication center is downloaded from the certificate authentication center before the expiration time. When forwarding the blockchain data obtained from the consensus node to the service node, the routing node may simultaneously send its identity certificate to the service node to indicate the valid identity of the routing node. Therefore, when receiving the blockchain data sent by the routing node, the service node may check whether the identity certificate of the routing node is valid according to the root certificate public key in the downloaded new root certificate, to verify the identity of the routing node.

In an embodiment, the above method further includes: establishing, by the service node, a test connection to the routing node according to the new identity certificate; establishing, by the service node when the connection succeeds, a connection to the routing node by using the new identity certificate; and establishing, by the service node when the connection fails, a connection to the routing node by continuously using the old identity certificate of the service node before the expiration time of the old root certificate.

Specifically, after receiving the new identity certificate issued by using the new root certificate, the service node may attempt to establish a test connection to the routing node by using the new identity certificate. If the connection succeeds, before the expiration time of the old root certificate, the service node may only use its new identity certificate to communicate with the routing node. If the connection fails, before the expiration time of the root certificate, the service node may continuously use the old identity certificate as a valid proof of its identity. In addition, after a period of time, the service node may attempt to use its new identity certificate to establish a connection to the routing node again.

In an embodiment, if the service node does not obtain the data block including the root certificate replacement notification after the expiration time of the root certificate, the old identity certificate of the service node cannot pass the verification of the routing node and the service node cannot access the consensus subnet. In this case, the service node may directly download the new root certificate from the certificate authentication center and request the certificate authentication center to replace the identity certificate of the service node.

In an embodiment, the above method further includes: sending, by the service node, an authentication request carrying a service node identifier and registration information to the certificate authentication center when the service node does not obtain, before the expiration time of the old root certificate, the new identity certificate signed with the new root certificate, so that the certificate authentication center issues the new identity certificate to the service node according to the new root certificate, the new identity certificate including the service node identifier and the registration information.

In this embodiment, after the expiration time of the new root certificate, the service node and the routing node can only use the new root certificate to perform identity verification, and the old root certificate is invalid. If the service node cannot obtain the new identity certificate signed with the new root certificate before the expiration time, the service node may request again, according to its service node identifier and registration information, the certificate authentication center to issue the new identity certificate. A public and private key pair in the new identity certificate requested to be issued may be different from the locally stored old public and private key pair.

Figure 7:
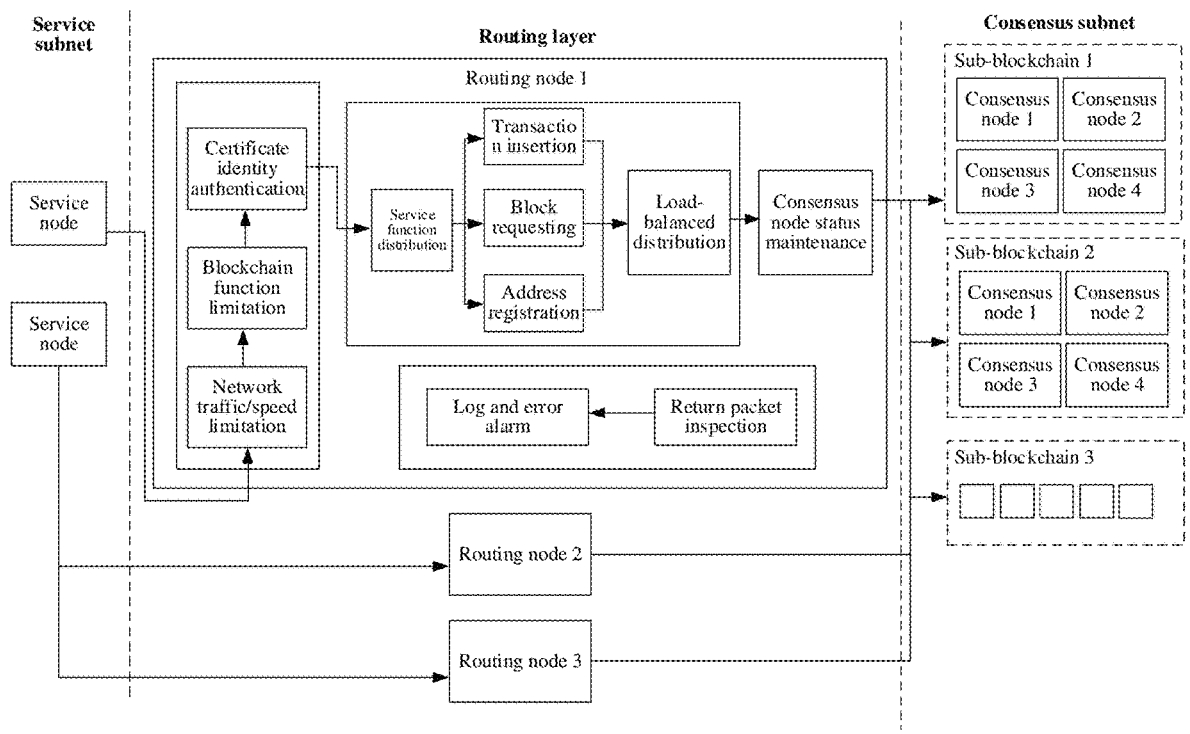
FIG. 7 is a schematic diagram of functional modules of a blockchain network according to a specific embodiment.

FIG. 7 is a schematic diagram of functional modules of a blockchain network according to a specific embodiment. Referring to FIG. 7, service nodes in a service subnet access consensus nodes in a consensus subnet through routing nodes. Functional modules in each routing node include a network traffic/speed limitation module configured to control network traffic and a packet quantity in the entire blockchain network, a blockchain function limitation module configured to restrict external service nodes from accessing some functions of the consensus subnet, a certificate identity authentication module configured to perform identity verification on each external service node initiating a request, a service function distribution module configured to distribute different types of service requests, a transaction inserting module configured to forward a transaction inserting request, a block requesting module configured to forward a data block request, an address registration module configured to forward an address registration request, a load-balanced distribution module configured to control consensus nodes to process requests in a balanced manner, a consensus node status maintaining module configured to maintain current availability of the consensus nodes, and a return packet inspection module and a log and error alarm module that are configured to analyze log data after the log data returned by the consensus node is received.

Figure 8:
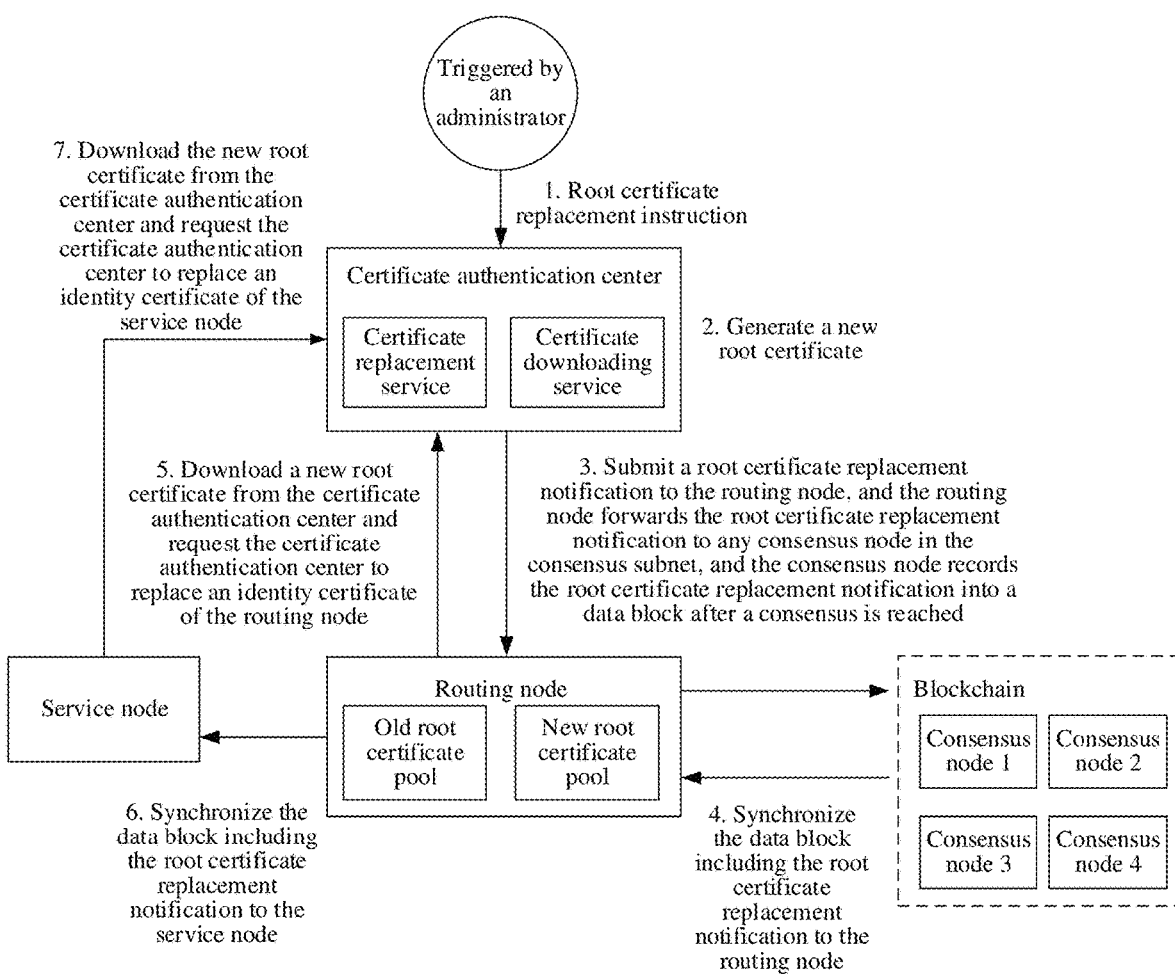
FIG. 8 is a diagram of a data flow of replacing an identity certificate in a blockchain network according to an embodiment.

FIG. 8 is a diagram of a data flow of replacing an identity certificate in a blockchain network according to an embodiment. Referring to FIG. 8, (1) an administrator triggers a root certificate replacement instruction; (2) after receiving the instruction, a certificate authentication center generates a new root certificate, optionally, the certificate authentication center may generate the new root certificate through a certificate replacement service; (3) the certificate authentication center submits the root certificate replacement notification to a routing node, and the routing node forwards the root certificate replacement notification to any consensus node in a consensus subnet, after the consensus of the consensus node, the root certificate replacement notification is recorded into a data block; (4) the consensus node synchronizes the data block including the root certificate replacement notification to the routing node; (5) after receiving the data block including the root certificate replacement notification, the routing node downloads the new root certificate from the certificate authentication center and requests the certificate authentication center to replace an identity certificate of the routing node; (6) the routing node synchronizes the data block including the root certificate replacement notification to a service node; and (7) after receiving the data block including the root certificate replacement notification, the service node downloads the new root certificate from the certificate authentication center and requests the certificate authentication center to replace an identity certificate of the service node.

Figure 9:
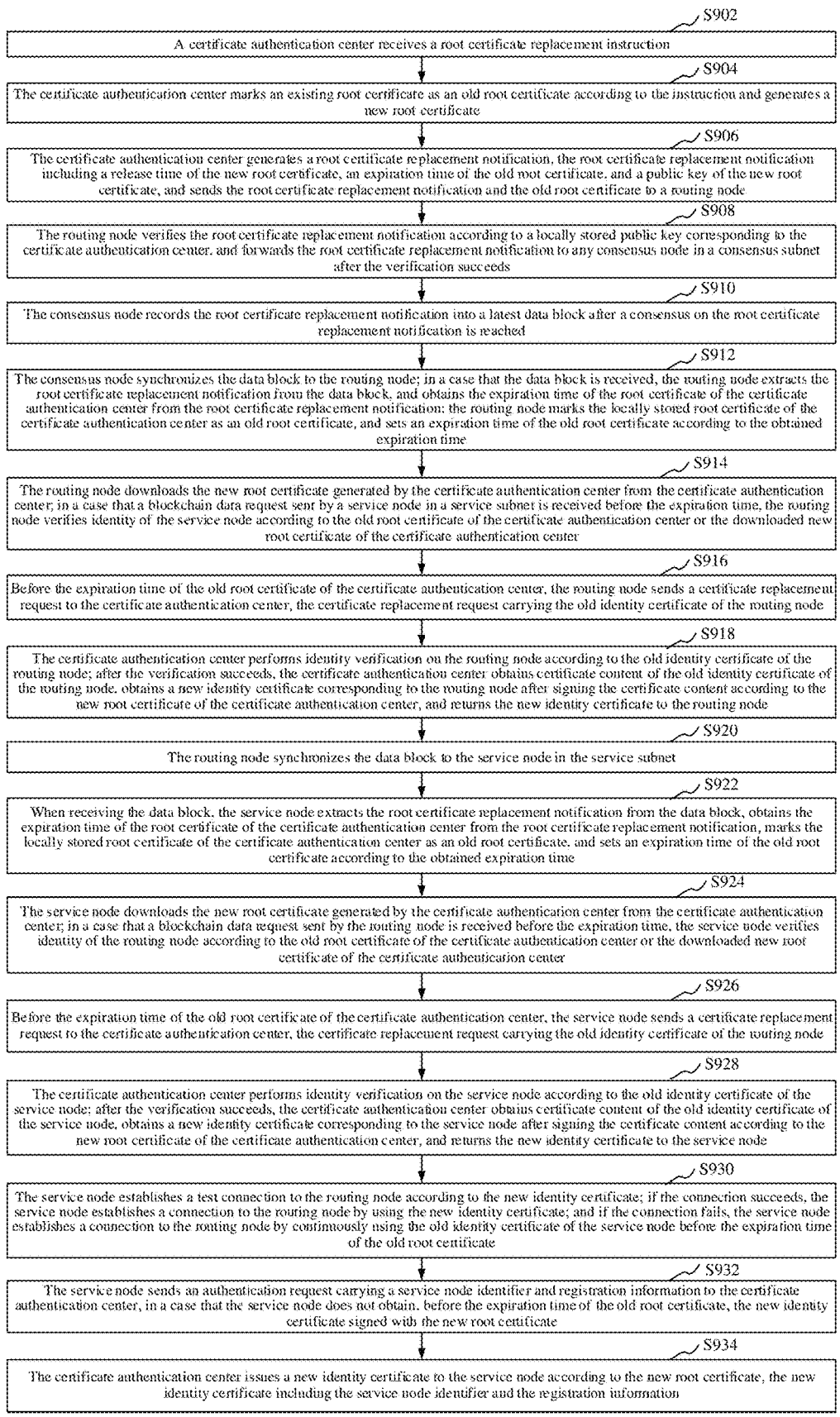
FIG. 9 is a schematic flowchart of replacing an identity certificate in a blockchain network according to a specific embodiment.

FIG. 9 is a schematic flowchart of a method for replacing an identity certificate in a blockchain network according to a specific embodiment. It is to be understood that, although the steps in the flowchart of FIG. 9 are sequentially shown according to the indication of arrows, the steps are not necessarily sequentially performed according to the sequence indicated by the arrows. Unless explicitly specified in this application, execution of the steps is not strictly limited, and the steps may be performed in other sequences. In addition, at least some steps in FIG. 9 may include a plurality of sub steps or a plurality of stages. The sub steps or the stages are not necessarily performed at the same moment, but may be performed at different moments. The sub steps or the stages are not necessarily performed in sequence, but may be performed in turn or alternately with other steps or at least some of sub steps or stages of other steps. In some embodiments, there may be additional steps or some of the steps shown may not be performed. Referring to FIG. 9, the method includes the following steps:

S902. A certificate authentication center receives a root certificate replacement instruction.

S904. The certificate authentication center marks an existing root certificate as an old root certificate according to the instruction and generates a new root certificate.

S906. The certificate authentication center generates a root certificate replacement notification, the root certificate replacement notification including a release time of the new root certificate, an expiration time of the old root certificate, and a public key of the new root certificate, and sends the root certificate replacement notification and the old root certificate to a routing node.

S908. The routing node verifies the root certificate replacement notification according to a locally stored public key corresponding to the certificate authentication center, and forwards the root certificate replacement notification to any consensus node in a consensus subnet after the verification succeeds.

S910. The consensus node records the root certificate replacement notification into a latest data block after a consensus on the root certificate replacement notification is reached.

S912. The consensus node synchronizes the data block to the routing node; when the data block is received, the routing node extracts the root certificate replacement notification from the data block, and obtains the expiration time of the root certificate of the certificate authentication center from the root certificate replacement notification; the routing node marks the locally stored root certificate of the certificate authentication center as an old root certificate, and sets an expiration time of the old root certificate according to the obtained expiration time.

S914. The routing node downloads the new root certificate generated by the certificate authentication center from the certificate authentication center; when a blockchain data request sent by a service node in a service subnet is received before the expiration time, the routing node verifies identity of the service node according to the old root certificate of the certificate authentication center or the downloaded new root certificate of the certificate authentication center.

S916. Before the expiration time of the old root certificate of the certificate authentication center, the routing node sends a certificate replacement request to the certificate authentication center, the certificate replacement request carrying the old identity certificate of the routing node.

S918. The certificate authentication center performs identity verification on the routing node according to the old identity certificate of the routing node; after the verification succeeds, the certificate authentication center obtains certificate content of the old identity certificate of the routing node, obtains a new identity certificate corresponding to the routing node after signing the certificate content according to the new root certificate of the certificate authentication center, and returns the new identity certificate to the routing node.

S920. The routing node synchronizes the data block to the service node in the service subnet.

S922. When receiving the data block, the service node extracts the root certificate replacement notification from the data block, obtains the expiration time of the root certificate of the certificate authentication center from the root certificate replacement notification, marks the locally stored root certificate of the certificate authentication center as an old root certificate, and sets an expiration time of the old root certificate according to the obtained expiration time.

S924. The service node downloads the new root certificate generated by the certificate authentication center from the certificate authentication center; when a blockchain data request sent by the routing node is received before the expiration time, the service node verifies identity of the routing node according to the old root certificate of the certificate authentication center or the downloaded new root certificate of the certificate authentication center.

S926. Before the expiration time of the old root certificate of the certificate authentication center, the service node sends a certificate replacement request to the certificate authentication center, the certificate replacement request carrying the old identity certificate of the routing node.

S928. The certificate authentication center performs identity verification on the service node according to the old identity certificate of the service node; after the verification succeeds, the certificate authentication center obtains certificate content of the old identity certificate of the service node, obtains a new identity certificate corresponding to the service node after signing the certificate content according to the new root certificate of the certificate authentication center, and returns the new identity certificate to the service node.

S930. The service node establishes a test connection to the routing node according to the new identity certificate; if the connection succeeds, the service node establishes a connection to the routing node by using the new identity certificate; and if the connection fails, the service node establishes a connection to the routing node by continuously using the old identity certificate of the service node before the expiration time of the old root certificate.

S932. The service node sends an authentication request carrying a service node identifier and registration information to the certificate authentication center, when the service node does not obtain, before the expiration time of the old root certificate, the new identity certificate signed with the new root certificate.

S934. The certificate authentication center issues a new identity certificate to the service node according to the new root certificate, the new identity certificate including the service node identifier and the registration information.

Figure 10:
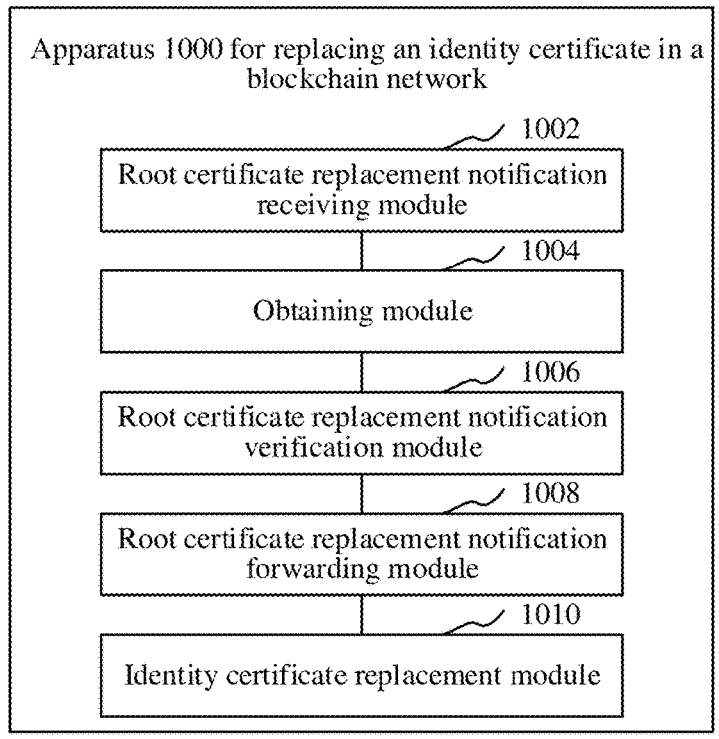
FIG. 10 is a structural block diagram of an apparatus for replacing an identity certificate in a blockchain network according to an embodiment.

In an embodiment, as shown in FIG. 10, an apparatus 1000 for replacing an identity certificate in a blockchain network is provided. The blockchain network includes a service subnet, a consensus subnet, and a routing layer used for isolating the service subnet from the consensus subnet. The apparatus is applied to a routing node in the routing layer. The apparatus includes: a root certificate replacement notification receiving module 1002, an obtaining module 1004, a root certificate replacement notification verification module 1006, a root certificate replacement notification forwarding module 1008, and an identity certificate replacement module 1010.

The root certificate replacement notification receiving module 1002 is configured to receive a root certificate replacement notification sent by a certificate authentication center.

The obtaining module 1004 is configured to obtain a public key corresponding to the certificate authentication center from an old root certificate of the certificate authentication center.

The root certificate replacement notification verification module 1006 is configured to verify the root certificate replacement notification by using the public key corresponding to the certificate authentication center.

The root certificate replacement notification forwarding module 1008 is configured to forward the root certificate replacement notification to a consensus node in the consensus subnet after the validation succeeds, so that the consensus node records the root certificate replacement notification into a latest data block after a consensus on the root certificate replacement notification is reached.

The identity certificate replacement module 1010 is configured to request, when the data block is received, the certificate authentication center to replace an identity certificate, a new identity certificate obtained through requesting being authenticated with a new root certificate of the certificate authentication center.

In an embodiment, the new root certificate of the certificate authentication center is generated by the following steps: The certificate authentication center receives a root certificate replacement instruction; the certificate authentication center marks an existing root certificate as an old root certificate according to the instruction; and the certificate authentication center generates a new root certificate, the generated new root certificate being used for issuing or replacing an identity certificate for a node in the blockchain network by the certificate authentication center.

In an embodiment, the root certificate replacement notification includes a hash value of root certificate replacement information, and the hash value is signed with the private key corresponding to the certificate authentication center. The root certificate replacement notification verification module 1006 is further configured to verify the signature by using the public key corresponding to the certificate authentication center to obtain a hash value of the root certificate replacement information, the hash value being obtained by performing calculation on the root certificate replacement information by using a preset algorithm by the certificate authentication center; directly calculate a hash value of the root certificate replacement information by using the preset algorithm; and determine that the verification succeeds when the hash value obtained by verifying the signature of the root certificate replacement information is equal to the hash value obtained by calculation.

In an embodiment, the above apparatus further includes a root certificate replacement notification parsing module that is configured to: extract the root certificate replacement notification from the data block when the data block is received; obtain an expiration time of the root certificate of the certificate authentication center from the root certificate replacement notification; and mark a locally stored root certificate of the certificate authentication center as an old root certificate, and set an expiration time of the old root certificate according to the obtained expiration time.

In an embodiment, the above apparatus further includes a new root certificate downloading module configured to download the new root certificate generated by the certificate authentication center from the certificate authentication center; and verify identity of the service node according to the downloaded new root certificate of the certificate authentication center when a blockchain data request sent by a service node in the service subnet is received.

In an embodiment, the above apparatus further includes a service node identity verification module configured to verify the identity of the service node according to the old root certificate of the certificate authentication center or the downloaded new root certificate of the certificate authentication center when the blockchain data request sent by the service node in the service subnet is received before the expiration time.

In an embodiment, the identity certificate replacement module 1010 is further configured to send a certificate replacement request to the certificate authentication center before an expiration time of an old root certificate of the certificate authentication center, the certificate replacement request carrying the old identity certificate of the routing node; perform, by using the certificate authentication center, identity verification on the routing node according to the old identity certificate of the routing node, obtain certificate content of the old identity certificate of the routing node after the verification succeeds, and obtain a new identity certificate corresponding to the routing node after signing the certificate content according to the new root certificate of the certificate authentication center; and receive the new identity certificate returned by the certificate authentication center.

In an embodiment, the above apparatus further includes a synchronization module configured to synchronize the data block to a service node in the service subnet so that the service node requests, when the root certificate replacement notification is parsed out from the data block, the certificate authentication center replaces an identity certificate.

In an embodiment, the step of requesting, by the service node, the certificate authentication center to replace an identity certificate includes: obtaining, by the service node, an expiration time of the root certificate of the certificate authentication center from the root certificate replacement notification, and sending a certificate replacement request carrying an old identity certificate of the service node to the certificate authentication center before the expiration time; and performing, by the certificate authentication center under the instruction of the certificate replacement request, identity verification on the service node according to the old identity certificate of the service node, obtaining certificate content of the old identity certificate of the service node after the verification succeeds, obtaining a new identity certificate corresponding to the service node after signing the certificate content according to the new root certificate of the certificate authentication center, and returning the new identity certificate to the service node.

In an embodiment, the service node marks a locally stored root certificate of the certificate authentication center as an old root certificate, sets an expiration time of the old root certificate according to the obtained expiration time, and downloads the new root certificate generated by the certificate authentication center from the certificate authentication center, and verifying identity of the routing node according to the downloaded new root certificate of the certificate authentication center when blockchain data sent by the routing node is received.

In an embodiment, the service node establishes a test connection to the routing node according to the new identity certificate; if the connection succeeds, the service node establishes a connection to the routing node by using the new identity certificate; and if the connection fails, the service node establishes a connection to the routing node by continuously using the old identity certificate of the service node before the expiration time of the old root certificate.

In an embodiment, when the service node does not obtain, before the expiration time of the old root certificate, the new identity certificate signed with the new root certificate, the service node sends an authentication request carrying a service node identifier and registration information to the certificate authentication center so that the certificate authentication center issues the new identity certificate to the service node according to the new root certificate, the new identity certificate including the service node identifier and the registration information.

In the above apparatus 1000 for replacing an identity certificate in a blockchain network, the blockchain network includes a service subnet, a routing layer, and a consensus subnet. The certificate authentication center sends the root certificate replacement notification to the routing node. When receiving the root certificate replacement notification sent by the certificate authentication center, the routing node verifies the root certificate replacement notification by using the public key in the old root certificate of the certificate authentication center, to ensure that the notification is indeed sent by the certificate authentication center. After the verification succeeds, the routing node forwards the notification to the consensus subnet, and the notification may be recorded into a latest data block after the consensus nodes reach a consensus. In this case, when the service node in the service subnet and the routing node in the routing layer that participate in the blockchain network synchronize the data block including the notification, the service node and the routing node request, from the certificate authentication center, identity certificates issued by using the new root certificate of the certificate authentication center, achieving the replacement of the identity certificate for each node in the blockchain network, and preventing the risk of the identity certificate being cracked or leaked.

Figure 11:
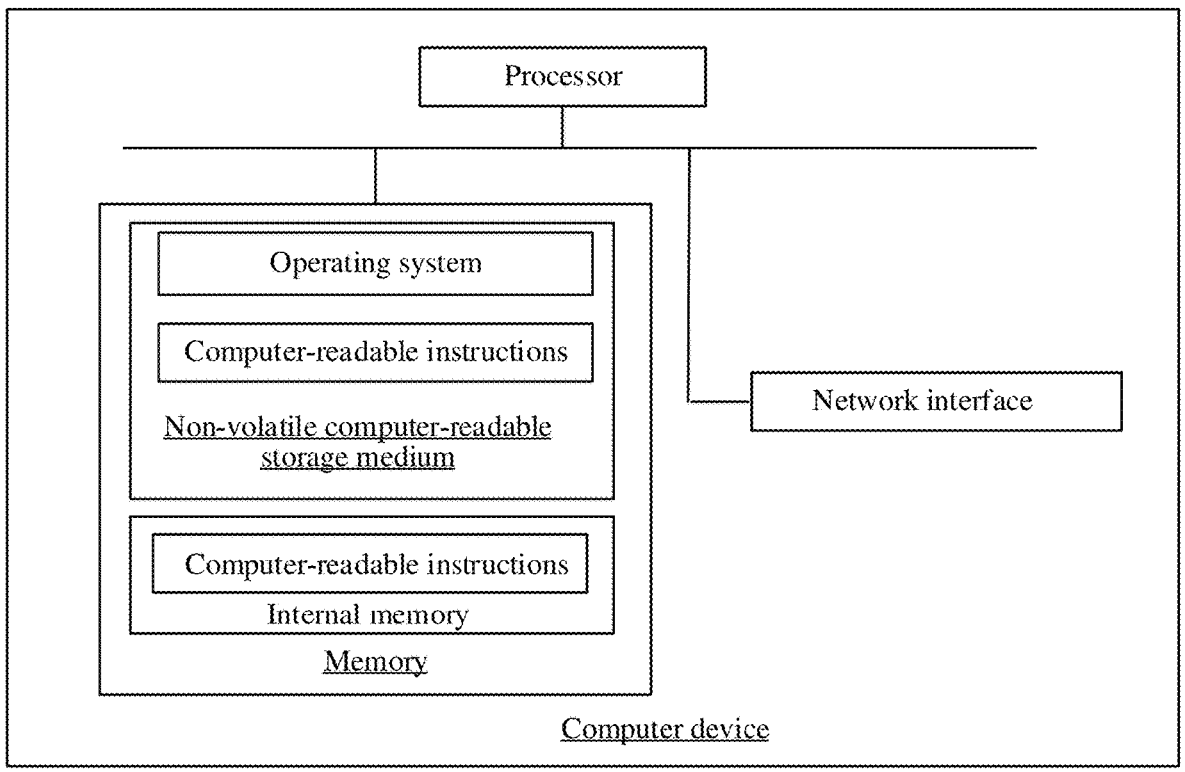
FIG. 11 is a structural block diagram of a computer device according to an embodiment.

FIG. 11 is a diagram of an internal structure of a computer device according to an embodiment. The computer device may be specifically a routing node 122 in FIG. 1 or may be other components in other Figures. As shown in FIG. 11, the computer device includes a processor, a memory, and a network interface connected by using a system bus. The memory includes a non-volatile storage medium and an internal memory. The non-volatile storage medium of the computer device stores an operating system, and may further store computer-readable instructions. When executed by the processor, the computer-readable instructions may cause the processor to implement the method for replacing an identity certificate in a blockchain network. The internal memory may also store computer-readable instructions. When executed by the processor, the computer-readable instructions may cause the processor to execute the method for replacing an identity certificate in a blockchain network.

A person skilled in the art may understand that, the structure shown in FIG. 11 is only a block diagram of a partial structure related to the solution of this application and does not limit the computer device to which the solution of this application is applied. Specifically, the computer device may include more or fewer members than those in the drawings, or some members may be combined, or a different member layout may be used.

In an embodiment, the apparatus 1000 for replacing an identity certificate in a blockchain network provided in this application may be implemented in a form of computer-readable instructions, and the computer-readable instructions may run on the computer device shown in FIG. 11. The memory of the computer device may store various readable instruction modules forming the apparatus for replacing an identity certificate in a blockchain network, for example, the root certificate replacement notification receiving module 1002, the obtaining module 1004, the root certificate replacement notification verification module 1006, the root certificate replacement notification forwarding module 1008, and the identity certificate replacement module 1010 shown in FIG. 10. The computer-readable instructions formed by the various readable instruction modules cause the processor to perform the steps of the method for replacing an identity certificate in a blockchain network of the embodiments of this application described in this specification.

For example, the computer device shown in FIG. 11 may perform step S502 by using the root certificate replacement notification receiving module 1002 in the apparatus 1000 for replacing an identity certificate in a blockchain network shown in FIG. 10. The computer device may perform step S504 by using the obtaining module 1004. The computer device may perform step S506 by using the root certificate replacement notification verification module 1006. The computer device may perform step S508 by using the root certificate replacement notification forwarding module 1008. The computer device may perform step S510 by using the identity certificate replacement module 1010.

In an embodiment, a computer device is provided. The computer device includes a memory and a processor. The memory stores computer-readable instructions, and the computer-readable instructions, when executed by the processor, cause the processor to perform the above steps of the method for replacing an identity certificate in a blockchain network. The steps of the method for replacing an identity certificate in a blockchain network may be steps of the method for replacing an identity certificate in a blockchain network in the above embodiments.

In an embodiment, a computer-readable storage medium is provided. The computer-readable storage medium stores computer-readable instructions, and the computer-readable instructions, when executed by a processor, cause the processor to perform the above steps of the method for replacing an identity certificate in a blockchain network. The steps of the method for replacing an identity certificate in a blockchain network may be steps of the method for replacing an identity certificate in a blockchain network in the above embodiments.

In an embodiment, a computer program product or a computer-readable instruction is provided. The computer program product or the computer-readable instruction includes computer-readable instructions, and the computer-readable instructions are stored in a computer-readable storage medium. A processor of a computer device reads the computer-readable instructions from the computer-readable storage medium. The processor executes the computer-readable instructions to cause the computer device to perform the steps in the above method embodiments. A person of ordinary skill in the art may understand that all or some of the procedures of the methods of the above embodiments may be implemented by computer-readable instructions instructing relevant hardware. The computer-readable instructions may be stored in a non-volatile computer-readable storage medium. When the computer-readable instructions are executed, the procedures of the embodiments of the above methods may be included. Any reference to the memory, the storage, the database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (RDRAM).

The technical features in the above embodiments may be combined in various arrangements. For concise description, not all possible combinations of the technical features in the embodiment are described. However, provided that combinations of the technical features do not conflict with each other, the combinations of the technical features are considered as falling within the scope recorded in this specification.

The above embodiments show only several implementations of this application, and descriptions thereof are in detail, but shall not be understood as limiting the patent scope of this application. A person of ordinary skill in the art may further make variations and improvements without departing from the ideas of this application, and the variations and improvements shall fall within the protection scope of this application. Therefore, the protection scope of the patent of this application is to be subject to the appended claims.

What is claimed is:

1. A method performed by a system for replacing an identity certificate in a blockchain network, the blockchain network comprising a service subnet, a consensus subnet, and a routing layer used for isolating the service subnet from the consensus subnet, the method comprising:
   generating, by a certificate authentication center, a new root certificate;
   receiving, by a routing node, a root certificate replacement notification transmitted by the certificate authentication center;
   obtaining, by the routing node, a public key corresponding to the certificate authentication center from an old root certificate of the certificate authentication center;
   verifying, by the routing node, the root certificate replacement notification by using the public key corresponding to the certificate authentication center;

forwarding, by the routing node, the root certificate replacement notification to a consensus node in the consensus subnet after verifying the root certificate replacement notification;

recording, by the consensus node, the root certificate replacement notification into a latest data block after a consensus on the root certificate replacement notification is reached by the consensus node;

synchronizing, by the routing node, with the consensus node to receive the latest data block;

requesting, by the routing node, after the latest data block is received, the certificate authentication center to replace an old identity certificate of the routing node;

after requesting, obtaining from the certificate authentication center, a new identity certificate, the new identity certificate signed with the new root certificate of the certificate authentication center;

synchronizing, by the routing node, the latest data block to a service node in the service subnet;

parsing, by the service node, the root certificate replacement notification from the latest data block;

requesting, by the service node, the certificate authentication center to replace an old identity certificate of the service node;

establishing, by the service node, a test connection to the routing node according to the new identity certificate corresponding to the service node;

establishing, by the service node, when the test connection succeeds, a connection to the routing node by using the new identity certificate corresponding to the service node; and establishing, by the service node, when the test connection fails, a connection to the routing node by continuously using the old identity certificate of the service node as a valid proof of its identity before an expiration time of the old root certificate.

2. The method according to claim 1, wherein the new root certificate of the certificate authentication center is generated through the following operations:

receiving, by the certificate authentication center, a root certificate replacement instruction;

marking, by the certificate authentication center, an existing root certificate as the old root certificate according to the instruction; and generating, by the certificate authentication center, the new root certificate, the generated new root certificate being used for issuing or replacing an identity certificate of a node in the blockchain network by the certificate authentication center.

3. The method according to claim 1, wherein the root certificate replacement notification comprises a hash value of root certificate replacement information, the hash value is signed with a private key corresponding to the certificate authentication center, and the verifying the root certificate replacement notification by using the public key corresponding to the certificate authentication center comprises:

verifying a signature of the hash value of the root certificate replacement information by using the public key corresponding to the certificate authentication center to obtain the hash value of the root certificate replacement information, the hash value being obtained by performing calculation on the root certificate replacement information by using a preset algorithm by the certificate authentication center;

calculating a hash value of the root certificate replacement information by using the preset algorithm; and determining that the verification succeeds when the hash value obtained by verifying the signature of the hash value of the root certificate replacement information is equal to the hash value obtained by calculation.

4. The method according to claim 1, further comprising:

extracting the root certificate replacement notification from the latest data block when the latest data block is received;

obtaining an expiration time of the root certificate of the certificate authentication center from the root certificate replacement notification; and marking a locally stored root certificate of the certificate authentication center as the old root certificate, and setting an expiration time of the old root certificate according to the obtained expiration time.

5. The method according to claim 4, further comprising:

downloading the new root certificate generated by the certificate authentication center from the certificate authentication center; and verifying, when a blockchain data request transmitted by a service node in the service subnet is received, identity of the service node according to the new root certificate of the certificate authentication center.

6. The method according to claim 5, further comprising:

verifying, when the blockchain data request transmitted by the service node in the service subnet is received before the expiration time, the identity of the service node according to the old root certificate of the certificate authentication center or the downloaded new root certificate of the certificate authentication center.

7. The method according to claim 1, wherein requesting the certificate authentication center to replace an old identity certificate comprises:

sending a certificate replacement request to the certificate authentication center before an expiration time of the old root certificate of the certificate authentication center, the certificate replacement request carrying an old identity certificate of the routing node;

performing, by using the certificate authentication center, identity verification on the routing node according to the old identity certificate of the routing node, obtaining certificate content of the old identity certificate of the routing node after the verification succeeds, and obtaining a new identity certificate corresponding to the routing node after signing the certificate content according to the new root certificate of the certificate authentication center; and receiving the new identity certificate corresponding to the routing node returned by the certificate authentication center.

8. The method according to claim 1, wherein requesting, by the service node, the certificate authentication center to replace an old identity certificate comprises:

obtaining, by the service node, an expiration time of the root certificate of the certificate authentication center from the root certificate replacement notification, and sending a certificate replacement request carrying an old identity certificate of the service node to the certificate authentication center before the expiration time; and performing, by the certificate authentication center under instruction of the certificate replacement request, identity verification on the service node according to the old identity certificate of the service node, obtaining certificate content of the old identity certificate of the service node after the verification succeeds, obtaining a new identity certificate corresponding to the service node after signing the certificate content according to the new root certificate of the certificate authentication center, and returning to the service node the new identity certificate corresponding to the service node.

9. The method according to claim 8, further comprising: marking, by the service node, a locally stored root certificate of the certificate authentication center as the old root certificate, setting an expiration time of the old root certificate according to the obtained expiration time, downloading the new root certificate generated by the certificate authentication center from the certificate authentication center, and verifying, when blockchain data transmitted by the routing node is received, identity of the routing node according to the downloaded new root certificate of the certificate authentication center.

10. The method according to claim 8, further comprising: sending, by the service node, an authentication request carrying a service node identifier and registration information to the certificate authentication center when the service node does not obtain, before the expiration time of the old root certificate, the new identity certificate signed with the new root certificate, so that the certificate authentication center issues the new identity certificate to the service node according to the new root certificate, the new identity certificate comprising the service node identifier and the registration information.

11. One or more non-transitory computer-readable storage media, storing computer-readable instructions, the computer-readable instructions, when executed by one or more processors, cause the one or more processors;
generate, by a certificate authentication center, a new root certificate;
receive, by a routing node, a root certificate replacement notification transmitted by the certificate authentication center;
obtain, by the routing node, a public key corresponding to the certificate authentication center from an old root certificate of the certificate authentication center;
verify, by the routing node, the root certificate replacement notification by using the public key corresponding to the certificate authentication center;
forward, by the routing node, the root certificate replacement notification to a consensus node in the consensus subnet after verifying the root certificate replacement notification;
record, by the consensus node, the root certificate replacement notification into a latest data block after a consensus on the root certificate replacement notification is reached by the consensus node;
synchronize, by the routing node, with the consensus node to receive the latest data block;
request, by the routing node, after the latest data block is received, the certificate authentication center to replace an old identity certificate of the routing node;
after requesting, obtaining from the certificate authentication center, a new identity certificate, the new identity certificate signed with the new root certificate of the certificate authentication center;
synchronize, by the routing node, the latest data block to a service node in the service subnet;
parse, by the service node, the root certificate replacement notification from the latest data block;
request, by the service node, the certificate authentication center to replace an old identity certificate of the service node;
establish, by the service node, a test connection to the routing node according to the new identity certificate corresponding to the service node;
establish, by the service node, when the test connection succeeds, a connection to the routing node by using the new identity certificate corresponding to the service node; and
establish, by the service node, when the test connection fails, a connection to the routing node by continuously using the old identity certificate of the service node as a valid proof of its identity before an expiration time of the old root certificate.

12. A computer device, comprising a non-transitory memory and one or more processors, the non-transitory memory storing computer-readable instructions, the computer-readable instructions, when executed by the one or more processors, cause the one or more processors to perform operations comprising;
generating, by a certificate authentication center, a new root certificate;
receiving, by a routing node, a root certificate replacement notification transmitted by the certificate authentication center;
obtaining, by the routing node, a public key corresponding to the certificate authentication center from an old root certificate of the certificate authentication center;
verifying, by the routing node, the root certificate replacement notification by using the public key corresponding to the certificate authentication center;
forwarding, by the routing node, the root certificate replacement notification to a consensus node in the consensus subnet after verifying the root certificate replacement notification;
recording, by the consensus node, the root certificate replacement notification into a latest data block after a consensus on the root certificate replacement notification is reached by the consensus node;
synchronizing, by the routing node, with the consensus node to receive the latest data block;
requesting, by the routing node, after the latest data block is received, the certificate authentication center to replace an old identity certificate of the routing node;
after requesting, obtaining from the certificate authentication center, a new identity certificate, the new identity certificate signed with the new root certificate of the certificate authentication center;
synchronizing, by the routing node, the latest data block to a service node in the service subnet;
parsing, by the service node, the root certificate replacement notification from the latest data block;
requesting, by the service node, the certificate authentication center to replace an old identity certificate of the service node;
establishing, by the service node, a test connection to the routing node according to the new identity certificate corresponding to the service node;
establishing, by the service node, when the test connection succeeds, a connection to the routing node by using the new identity certificate corresponding to the service node; and
establishing, by the service node, when the test connection fails, a connection to the routing node by continuously using the old identity certificate of the service node as a valid proof of its identity before an expiration time of the old root certificate.

13. The computer device according to claim 12, wherein the new root certificate of the certificate authentication center is generated through the following operations:
    receiving, by the certificate authentication center, a root certificate replacement instruction;
    marking, by the certificate authentication center, an existing root certificate as an the old root certificate according to the instruction; and
    generating, by the certificate authentication center, the new root certificate, the generated new root certificate being used for issuing or replacing an identity certificate of a node in a blockchain network by the certificate authentication center.

14. The computer device according to claim 12, wherein the root certificate replacement notification comprises a hash value of root certificate replacement information, the hash value is signed with a private key corresponding to the certificate authentication center, and the verifying the root certificate replacement notification by using the public key corresponding to the certificate authentication center comprises:
    verifying a signature of the hash value of the root certificate replacement information by using the public key corresponding to the certificate authentication center to obtain a the hash value of the root certificate replacement information, the hash value being obtained by performing calculation on the root certificate replacement information by using a preset algorithm by the certificate authentication center;
    directly calculating a hash value of the root certificate replacement information by using the preset algorithm; and
    determining that the verification succeeds when the hash value obtained by verifying the signature of the root certificate replacement information is equal to the hash value obtained by calculation.

15. The computer device according to claim 12, wherein the operations further comprise:
    extracting the root certificate replacement notification from the latest data block in a case when the latest data block is received;
    obtaining an expiration time of the root certificate of the certificate authentication center from the root certificate replacement notification; and
    marking a locally stored root certificate of the certificate authentication center as an the old root certificate, and setting an expiration time of the old root certificate according to the obtained expiration time.

16. The computer device according to claim 12, wherein the requesting the certificate authentication center to replace an old identity certificate comprises:
    sending a certificate replacement request to the certificate authentication center before an expiration time of an the old root certificate of the certificate authentication center, the certificate replacement request carrying an old identity certificate of a routing node;
    performing, by using the certificate authentication center, identity verification on the routing node according to the old identity certificate of the routing node, obtaining certificate content of the old identity certificate of the routing node after the verification succeeds, and obtaining a new identity certificate corresponding to the routing node after signing the certificate content according to the new root certificate of the certificate authentication center; and
    receiving the new identity certificate corresponding to the routing node returned by the certificate authentication center.

17. The computer device according to claim 12, wherein requesting, by the service node, the certificate authentication center to replace an old identity certificate comprises:
    obtaining, by the service node, an expiration time of the root certificate of the certificate authentication center from the root certificate replacement notification, and sending a certificate replacement request carrying an old identity certificate of the service node to the certificate authentication center before the expiration time; and
    performing, by the certificate authentication center under the instruction of the certificate replacement request, identity verification on the service node according to the old identity certificate of the service node, obtaining certificate content of the old identity certificate of the service node after the verification succeeds, obtaining a new identity certificate corresponding to the service node after signing the certificate content according to the new root certificate of the certificate authentication center, and returning to the service node the new identity certificate corresponding to the service node.

18. The computer device according to claim 17, wherein the operations further comprise:
    sending, by the service node, an authentication request carrying a service node identifier and registration information to the certificate authentication center when the service node does not obtain, before the expiration time of the old root certificate, the new identity certificate signed with the new root certificate, so that the certificate authentication center issues the new identity certificate to the service node according to the new root certificate, the new identity certificate comprising the service node identifier and the registration information.

19. The computer device according to claim 15, wherein the operations further comprise:
    downloading the new root certificate generated by the certificate authentication center from the certificate authentication center; and
    verifying, when a blockchain data request transmitted by a service node in the service subnet is received, identity of the service node according to the new root certificate of the certificate authentication center.

20. The computer device according to claim 19, wherein the operations further comprise:
    verifying, when the blockchain data request transmitted by the service node in the service subnet is received before the expiration time, the identity of the service node according to the old root certificate of the certificate authentication center or the downloaded new root certificate of the certificate authentication center.

\* \* \* \* \*